US011295589B2

(12) United States Patent
Cho et al.

(10) Patent No.: US 11,295,589 B2
(45) Date of Patent: Apr. 5, 2022

(54) IMAGE PROCESSING DEVICE AND METHOD FOR SIMULTANEOUSLY TRANSMITTING A PLURALITY OF PIECES OF IMAGE DATA OBTAINED FROM A PLURALITY OF CAMERA MODULES

(71) Applicant: HANWHA TECHWIN CO., LTD., Seongnam-si (KR)

(72) Inventors: Sung Bong Cho, Seongnam-si (KR); Il Hwang Cha, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 16/959,883

(22) PCT Filed: Mar. 19, 2018

(86) PCT No.: PCT/KR2018/003183
§ 371 (c)(1),
(2) Date: Jul. 2, 2020

(87) PCT Pub. No.: WO2019/160191
PCT Pub. Date: Aug. 22, 2019

(65) Prior Publication Data
US 2020/0336659 A1    Oct. 22, 2020

(30) Foreign Application Priority Data
Feb. 19, 2018 (KR) .................. 10-2018-0019531

(51) Int. Cl.
*G08B 13/196* (2006.01)
*H04N 5/232* (2006.01)
(Continued)

(52) U.S. Cl.
CPC ....... *G08B 13/19628* (2013.01); *G06F 9/445* (2013.01); *G06F 21/57* (2013.01);
(Continued)

(58) Field of Classification Search
CPC ........ G08B 13/19693; G08B 13/19628; H04N 5/2258
See application file for complete search history.

(56) References Cited

U.S. PATENT DOCUMENTS 7,773,121 B1 * 8/2010 Huntsberger .... H04N 5/232933
348/218.1
9,204,041 B1 * 12/2015 Campbell ............ H04N 13/239
(Continued)

FOREIGN PATENT DOCUMENTS

KR    10-2007-0058263 A    6/2007
KR    10-2011-0078655 A    7/2011
(Continued)

OTHER PUBLICATIONS

KIPO, Machine Translation of KR 10-1575222 (Year: 2021).*
(Continued)

*Primary Examiner* — David N Werner
(74) *Attorney, Agent, or Firm* — Sughrue Mion, PLLC

(57) ABSTRACT

Provided is a surveillance system including a communication module configured to receive a plurality of pieces of image data obtained by a plurality of camera modules, receive a multiple image data request from a client terminal, and transmit a multiple image data response including multiple image data to the client terminal; and a processer configured to generate the multiple image data by scaling the plurality of pieces of image data in response to the multiple image data request and combining a plurality of pieces of scaled image data, wherein the plurality of camera modules share one internet protocol (IP) address.

14 Claims, 14 Drawing Sheets

(51) Int. Cl.

| | | |
|---|---|---|
| *H04L 12/947* | (2013.01) | |
| *H04L 29/12* | (2006.01) | |
| *H04N 5/247* | (2006.01) | |
| *H04N 7/01* | (2006.01) | |
| *H04N 7/08* | (2006.01) | |
| *H04N 7/18* | (2006.01) | |
| *H04N 5/225* | (2006.01) | |
| *G06F 21/57* | (2013.01) | |
| *G06F 9/445* | (2018.01) | |
| *H04L 49/25* | (2022.01) | |
| *H04L 61/5007* | (2022.01) | |
| *H04N 21/443* | (2011.01) | |

(52) U.S. Cl.
CPC . *G08B 13/19654* (2013.01); *G08B 13/19656* (2013.01); *G08B 13/19693* (2013.01); *H04L 49/25* (2013.01); *H04L 61/2007* (2013.01); *H04N 5/2258* (2013.01); *H04N 5/23232* (2013.01); *H04N 5/232061* (2018.08); *H04N 5/247* (2013.01); *H04N 7/0117* (2013.01); *H04N 7/0806* (2013.01); *H04N 7/181* (2013.01); *G06F 21/575* (2013.01); *G06F 21/577* (2013.01); *G08B 13/19658* (2013.01); *H04N 21/4432* (2013.01)

(56) References Cited

U.S. PATENT DOCUMENTS

| | | | | |
|---|---|---|---|---|
| 10,057,487 | B1* | 8/2018 | Chen | H04N 5/2258 |
| 2004/0075741 | A1* | 4/2004 | Berkey | H04N 7/181 |
| | | | | 348/159 |
| 2004/0136388 | A1* | 7/2004 | Schaff | H04N 21/2662 |
| | | | | 370/401 |
| 2005/0141607 | A1* | 6/2005 | Kaplinsky | H04N 7/181 |
| | | | | 375/240.2 |
| 2005/0226463 | A1* | 10/2005 | Suzuki | G08B 13/19656 |
| | | | | 382/103 |
| 2006/0161960 | A1* | 7/2006 | Benoit | H04L 12/2807 |
| | | | | 725/105 |
| 2007/0235648 | A1* | 10/2007 | Teich | G08B 13/19641 |
| | | | | 250/330 |
| 2008/0060034 | A1* | 3/2008 | Egnal | G03B 37/04 |
| | | | | 725/105 |
| 2009/0290033 | A1* | 11/2009 | Jones | H04N 5/23238 |
| | | | | 348/218.1 |
| 2010/0274891 | A1* | 10/2010 | Lo | G08B 13/19669 |
| | | | | 709/224 |
| 2010/0303436 | A1 | 12/2010 | Chang et al. | |
| 2011/0234807 | A1* | 9/2011 | Jones | H04N 5/2258 |
| | | | | 348/159 |
| 2013/0159721 | A1* | 6/2013 | Steyer | H04N 21/443 |
| | | | | 713/176 |
| 2014/0267748 | A1* | 9/2014 | Lee | H04N 7/181 |
| | | | | 348/159 |
| 2014/0281990 | A1* | 9/2014 | Gu | G08B 13/19684 |
| | | | | 715/719 |
| 2015/0215586 | A1* | 7/2015 | Lasko | G08B 13/19645 |
| | | | | 348/143 |
| 2015/0358538 | A1* | 12/2015 | Donaldson | G03B 17/55 |
| | | | | 348/38 |
| 2016/0267759 | A1* | 9/2016 | Kerzner | G06T 19/006 |
| 2016/0379059 | A1* | 12/2016 | Gottschlich | H04N 5/23229 |
| | | | | 348/143 |
| 2017/0019574 | A1* | 1/2017 | Yang | H04N 5/2256 |
| 2019/0005789 | A1* | 1/2019 | Siu | G08B 13/19632 |
| 2019/0230269 | A1* | 7/2019 | Saito | H04N 5/2353 |
| 2020/0021862 | A1* | 1/2020 | Chen | H04N 21/2387 |
| 2020/0128160 | A1* | 4/2020 | Ikei | G03B 17/561 |
| 2021/0152378 | A1* | 5/2021 | Moore | H04N 21/6543 |

FOREIGN PATENT DOCUMENTS

| | | |
|---|---|---|
| KR | 10-2011-0088229 A | 8/2011 |
| KR | 10-2013-0044062 A | 5/2013 |
| KR | 10-2016-0046561 A | 4/2014 |
| KR | 10-2015-0055856 A | 5/2015 |
| KR | 10-1575222 B1 | 12/2015 |
| WO | WO-2012082127 A1 * 6/2012 ........... H04N 5/2258 |  |

OTHER PUBLICATIONS

KIPO, Machine Translation of KR 2013-0044062 (Year: 2021).*
WIPO Int'l Bureau, Translation of International Preliminary Report on Patentability for PCT/KR2018/003183 (dated Aug. 27, 2020) (Year: 2020).*
International Search Report (PCT/ISA/210) dated Nov. 19, 2018 by the International Searching Authority in counterpart International Patent Application No. PCT/KR2018/003183.
Written Opinion (PCT/ISA/237) dated Nov. 19, 2018 by the International Searching Authority in counterpart International Patent Application No. PCT/KR2018/003183.
Communication dated Oct. 8, 2021, issued by the European Patent Office in counterpart European Application No. 18905915.7.

* cited by examiner

IMAGE PROCESSING DEVICE AND METHOD FOR SIMULTANEOUSLY TRANSMITTING A PLURALITY OF PIECES OF IMAGE DATA OBTAINED FROM A PLURALITY OF CAMERA MODULES

TECHNICAL FIELD

The present disclosure relates to an image processing device and a method of processing a plurality of pieces of image data obtained by a network camera.

BACKGROUND ART

When a surveillance system provides an image received from a camera photographing a surveillance area through a screen, a controller may visually recognize the image through a user interface and adjust a rotation direction or a zoom magnification of the camera.

A surveillance system may monitor a plurality of areas at the same time through a plurality of cameras or may monitor one area in various directions through a camera equipped with a plurality of image sensors.

At this time, the camera classifies and processes a plurality of pieces of image data obtained by the plurality of image sensors through one processor. In the future, as the demand for high-resolution surveillance images increases, it is necessary to develop a surveillance system that may efficiently process high-resolution image data.

DESCRIPTION OF EMBODIMENTS

Technical Problem

The present disclosure provides an image processing device and a method for efficiently processing a plurality of pieces of image data obtained by a network camera.

Solution to Problem

According to an aspect of the present disclosure, a surveillance system includes a communication module configured to receive a plurality of pieces of image data obtained by a plurality of camera modules, receive a multiple image data request from a client terminal, and transmit a multiple image data response including multiple image data to the client terminal; and a processor configured to generate the multiple image data by scaling the plurality of pieces of image data in response to the multiple image data request and combining a plurality of pieces of scaled image data, wherein the plurality of camera modules share one internet protocol (IP) address.

In the present embodiment, the plurality of camera modules may constitute one network camera, and the multiple image data request may be a request for simultaneously receiving a plurality of pieces of image data obtained by the one network camera.

In the present embodiment, the communication module may receive a plurality of pieces of image data encoded by the plurality of camera modules from a network switch.

In the present embodiment, the processor may include a decoder configured to decode the plurality of pieces of image data; a scaler configured to scale a plurality of pieces of decoded image data; a multiplexer configured to generate the multiple image data by combining a plurality of pieces of scaled image data; and an encoder configured to encode the multiple image data, wherein the processor may include multiple image data encoded by the encoder in the multiple image data response.

In the present embodiment, the scaler may scale the plurality of pieces of decoded image data, such that the sum of the resolutions of the plurality of pieces of scaled image data is lower than or equal to a resolution required by the client terminal.

In the present embodiment, the communication module and the processor may be included in the host device, when the processor detects an operation error of the host device, the processor may select one camera module from among the plurality of camera modules as a master camera module, the communication module may transmit a network service provision request to the master camera module, and the master camera module may perform the function of the communication module and the function of the processor in response to the network service provision request.

In the present embodiment, the processor may select a camera module of a predetermined highest priority from among the plurality of camera modules or a camera module with the least load from among the plurality of camera modules as the master camera module.

According to another aspect of the present disclosure, an image processing device includes a field programmable gate array (FPGA) device configured to receive a plurality of pieces of image data from a plurality of camera modules, scale the plurality of pieces of image data, and generate multiple image data by combining a plurality of pieces of scaled image data; and a host device configured to receive the multiple image data from the FPGA device, receive a multiple image data request from a client terminal, and transmit a multiple image data response including the multiple image data to the client terminal, wherein the plurality of camera modules share one internet protocol (IP) address.

In the present embodiment, the plurality of pieces of image data received by the FPGA device from the plurality of camera modules may be raw data prior to image processing.

In the present embodiment, the FPGA device may scale the plurality of pieces of image data, such that the sum of the resolutions of the plurality of pieces of scaled image data is lower than or equal to a resolution required by the client terminal.

In the present embodiment, the host device may encode the multiple image data and include encoded multiple image data in the multiple image data response.

According to another aspect of the present disclosure, an image processing method includes receiving, by a communication module, a multiple image data request from a client terminal; receiving, by the communication module, a plurality of pieces of image data obtained by a plurality of camera modules; scaling, by a processor, the plurality of pieces of image data in response to the multiple image data request; generating, by the processor, the multiple image data by combining a plurality of pieces of scaled image data; and transmitting, by the communication module, a multiple image data response including the multiple image data to the client terminal, wherein the plurality of camera modules share one IP address.

In the present embodiment, the plurality of camera modules may constitute one network camera, and the multiple image data request may be a request for simultaneously receiving a plurality of pieces of image data obtained by the one network camera.

In the present embodiment, the communication module may receive a plurality of pieces of image data encoded by the plurality of camera modules from a network switch.

In the present embodiment, the scaling of the plurality of pieces of image data may include decoding, by a decoder, the plurality of pieces of image data; and scaling, by a scaler, a plurality of pieces of decoded image data, and the generating of the multiple image data may include generating, by a multiplexer, the multiple image data by combining a plurality of pieces of scaled image data; and encoding, by an encoder, the multiple image data.

In the present embodiment, in the scaling of the plurality of pieces of decoded image data, the plurality of pieces of decoded image data may be scaled by the scaler, such that the sum of the resolutions of the plurality of pieces of scaled image data is lower than or equal to a resolution required by the client terminal.

In the present embodiment, the communication module and the processor may be included in the host device, the method may further include selecting one camera module from among the plurality of camera modules as a master camera module when the processor detects an operation error of the host device; and transmitting, through the communication module, a network service provision request to the master camera module, and the master camera module may perform the function of the communication module and the function of the processor in response to the network service provision request.

In the present embodiment, in the selecting of the master camera module, the processor may select a camera module of a predetermined highest priority from among the plurality of camera modules or a camera module with the least load from among the plurality of camera modules as the master camera module.

In the present embodiment, the receiving of the multiple image data request and the transmitting of the multiple image data response may be performed by the host device, and the receiving of the plurality of pieces of image data, the scaling of the plurality of pieces of image data, and the generating of the multiple image data may be performed by the FPGA device distinct from the host device.

In the present embodiment, the plurality of pieces of image data received by the FPGA device from the plurality of camera modules may be raw data prior to image processing.

Advantageous Effects of Disclosure

According to embodiments of the present disclosure, it is possible to efficiently process and transmit a plurality of pieces of high resolution image data.

Also, as a master camera module controls the operation of a slave camera module and processes and provides a plurality of pieces of image data, limited resources may be utilized efficiently and the performance of a surveillance system may be improved.

Also, since multiple image data and single image data may be freely provided by a master camera module, user convenience may be improved.

Also, even when an error occurs in the operation of any one camera module from among a plurality of camera modules, image data of the other normally operating camera modules is collected and provided, thereby providing a surveillance system that is highly error-resistant.

Also, by processing a plurality of pieces of image data having high resolutions through a host device provided separately from a camera module, a high-performance surveillance system may be provided.

Also, when an error occurs in the operation of a host device itself, authorizations may be set to a camera module to collect and provide image data, thereby providing a surveillance system that is highly error-resistant.

Also, by using an FPGA device separately from a host device, it is possible to prevent a time difference between a plurality of pieces of image data and to increase the image processing speed of the host device.

BEST MODE

Figure 1:
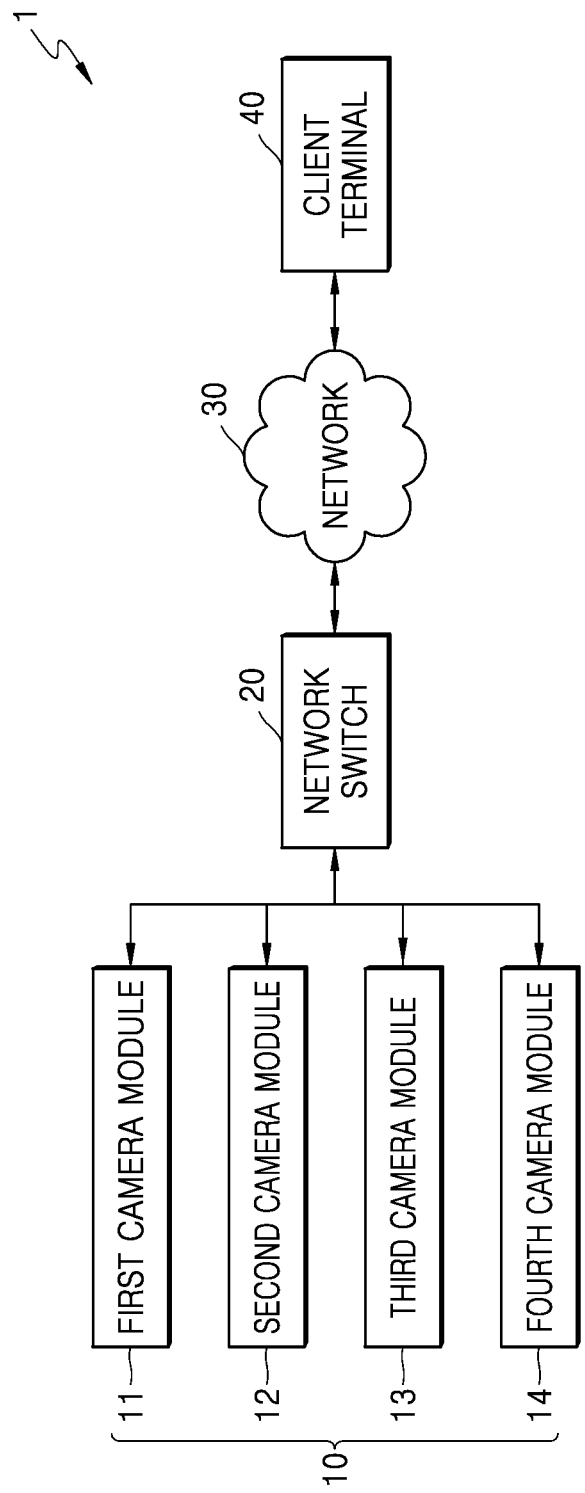
FIG. 1 is a diagram for explaining a surveillance system according to an embodiment.

The present disclosure provides a surveillance system including a communication module configured to receive a plurality of pieces of image data obtained by a plurality of camera modules, receive a multiple image data request from a client terminal, and transmit a multiple image data response including multiple image data to the client terminal; and a processer configured to generate the multiple image data by scaling the plurality of pieces of image data in response to the multiple image data request and combining a plurality of pieces of scaled image data, wherein the plurality of camera modules share one internet protocol (IP) address.

Mode of Disclosure

The present disclosure may include various embodiments and modifications, and embodiments thereof will be illustrated in the drawings and will be described herein in detail. However, this is not intended to limit the present disclosure to particular modes of practice, and it is to be appreciated that all changes, equivalents, and substitutes that do not depart from the spirit and technical scope of the inventive concept are encompassed in the present disclosure. In the description of the present disclosure, certain detailed explanations of the related art are omitted when it is deemed that they may unnecessarily obscure the essence of the present disclosure.

While such terms as "first," "second," etc., may be used to describe various elements, such elements must not be limited to the above terms. The above terms may be used only to distinguish one element from another.

The terms used in the present specification are merely used to describe particular embodiments, and are not intended to limit the inventive concept. An expression used in the singular encompasses the expression of the plural, unless it has a clearly different meaning in the context. In the present specification, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Some embodiments may be described in terms of functional block components and various processing operations. Such functional blocks may be realized by any number of hardware and/or software components configured to perform the specified functions. For example, the present disclosure may employ various integrated circuit (IC) components, e.g., memory elements, processing elements, logic elements, look-up tables, and the like, which may carry out a variety of functions under the control of one or more microprocessors or other control devices. Similarly, where the elements of the present disclosure are implemented using software programming or software elements, the invention may be implemented with any programming or scripting language such as C, C++, Java, assembler, or the like, with the various algorithms being implemented with any combination of data structures, objects, processes, routines or other programming elements. Functional blocks may be implemented in algorithms that are executed on one or more processors. Furthermore, the disclosure may employ any number of conventional techniques for electronics configuration, signal processing, and/or data processing. The words "mechanism", "element", "means", and "configuration" are used broadly and are not limited to mechanical or physical embodiments, but may include software routines in conjunction with processors, etc.

Hereinafter, various embodiments of the present disclosure will be described in detail with reference to the accompanying drawings.

The operation of a surveillance system 1 for image data of a camera module 10 described below is also applicable to audio data, setting data, metadata, etc. of the camera module 10.

Audio data may refer to sound that may be obtained in a surveillance area of the camera module 10.

Setting data may refer to profile information related to the operation of the camera module 10 itself and profile information related to the operation of the camera module 10 to obtain and transmit image data or audio data.

Metadata may refer to information related to image data or audio data obtained by the camera module 10.

First, referring to FIGS. 1 and 2, the overall operation of the surveillance system 1 according to an embodiment will be described.

FIG. 1 is a diagram for explaining the surveillance system 1 according to an embodiment.

Figure 2:
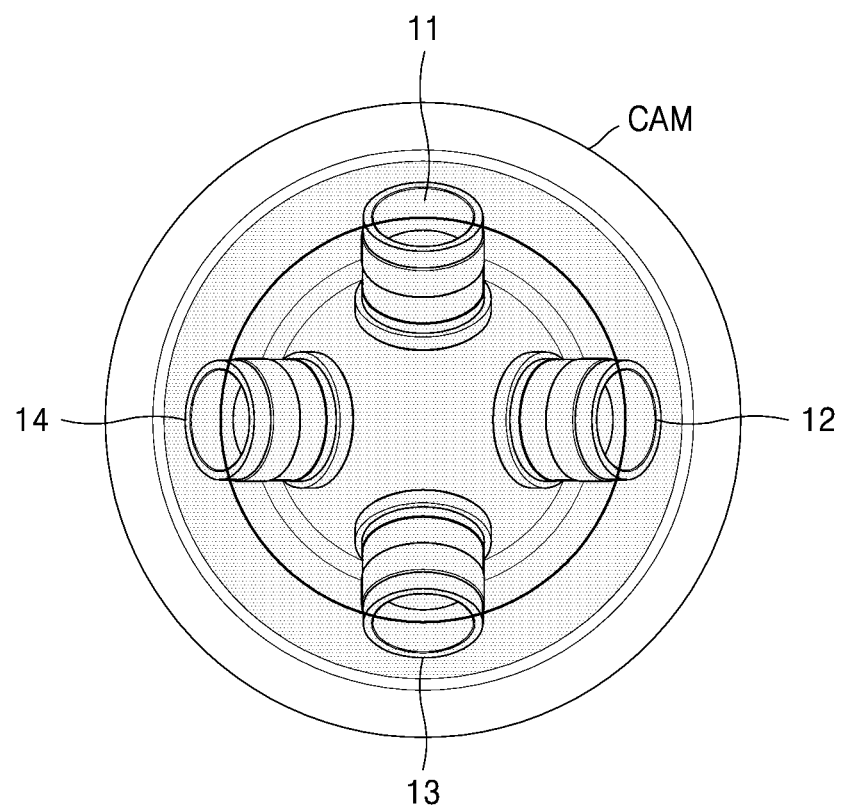
FIG. 2 is a diagram for describing a network camera according to an embodiment.

FIG. 2 is a diagram for describing a network camera CAM according to an embodiment.

Referring to FIGS. 1 and 2, the surveillance system 1 according to an embodiment includes a camera module 10, a network switch 20, a network 30, and a client terminal 40.

The surveillance system 1 according to an embodiment may provide a configuration that, when information regarding the camera module 10 collected by the network switch 20 is transmitted to the client terminal 40 through the network 30, a user may monitor information transmitted to the client terminal 40.

The network camera CAM may be used to photograph a surveillance area in real time for surveillance or security purposes, and one or more network cameras CAM may be provided.

The network camera CAM may include one or more camera modules 10.

For example, first to fourth camera modules 11 to 14 may be provided in one network camera CAM. At this time, the network camera CAM may simultaneously obtain four pieces of image data for a surveillance region by simultaneously capturing images of the surveillance region in four different directions.

The camera module 10 captures images of a surveillance area to obtain image data for the surveillance area.

The camera module 10 may obtain image data through an image sensor, such as a charge-coupled device (CCD) sensor or a complementary metal-oxide-semiconductor (CMOS) sensor.

The image data may be real-time image data and/or recorded image data.

Meanwhile, the image data may be video data and/or still image data.

The camera module 10 may be a low-power camera powered by a battery.

A low-power camera normally maintains a sleep mode and periodically wakes up to check whether an event is occurring. The low-power camera is switched to an active mode when an event is occurring and returns to the sleep mode when no event is occurring. In this way, the low-power camera may reduce power consumption by maintaining the active mode only when an event is occurring.

The camera module 10 may be a PTZ camera capable of panning and tilting and having a lens with adjustable magnification of zooming.

The camera module 10 may encode image data and transmit encoded image data to the client terminal 40 connected to the network 30 through the network switch 20. Here, the image data may be single image data or multiple image data.

The camera module 10 may store image data and image data address corresponding to the image data. An image data address may be information indicating a location where image data is stored.

A plurality of image data addresses may be different from one another. For example, first to fourth image data addresses address may be different from one another.

An image data address may be a real time streaming protocol (RTSP) address. When image data is stored in the camera module 10, an image data address may indicate the camera module 10. At this time, the client terminal 40 may access the camera module 10 in which image data is stored, based on an RTSP address.

The network switch 20 provides a path to access the network camera CAM.

For example, the network switch 20 may provide one internet protocol (IP) address indicating an access path to one network camera CAM. Therefore, the first to fourth camera modules 11 to 14 may share one IP address. In other words, the network switch 20 may operate as an IP router.

Meanwhile, the network switch 20 may access the camera module 10 based on an RTSP address requested by the client terminal 40. In other words, the network switch 20 may transmit a request of the client terminal 40 only to the camera module 10 indicated by an RTSP address.

The network 30 may include a wired network or a wireless network. The wireless network may be a 2nd generation (2G) or 3rd generation (3G) cellular communication system, a 3rd generation partnership project (3GPP), a 4th generation (4G) communication system, a long-term evolution (LTE) network, a world interoperability for microwave access (WiMAX) network, etc.

The client terminal 40 may display and store image data transmitted from the network switch 20. The client terminal 40 may receive a user input and transmit the user input to the network switch 20.

The client terminal 40 may include at least one processor. The client terminal 40 may be driven while being included in other hardware devices, such as a microprocessor or general purpose computer system. The client terminal 40 may be a personal computer or a mobile terminal.

Figure 3:
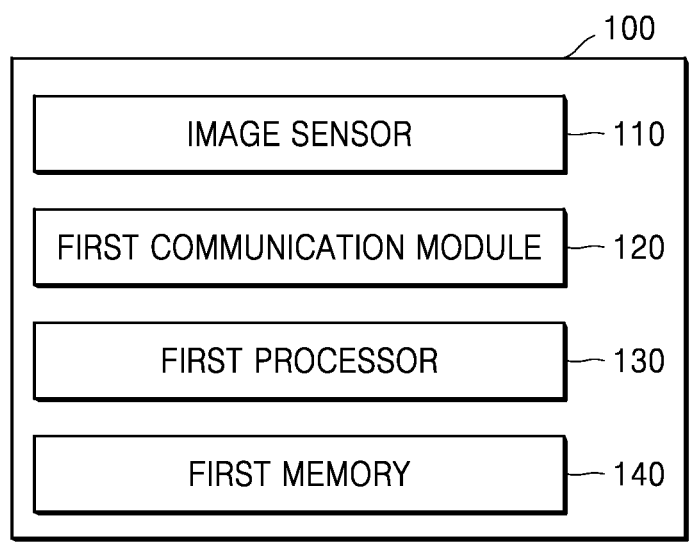
FIG. 3 is a block diagram showing the configuration of an image processing device according to an embodiment.

FIG. 3 is a block diagram showing the configuration of an image processing device 100 according to an embodiment.

Figure 4:
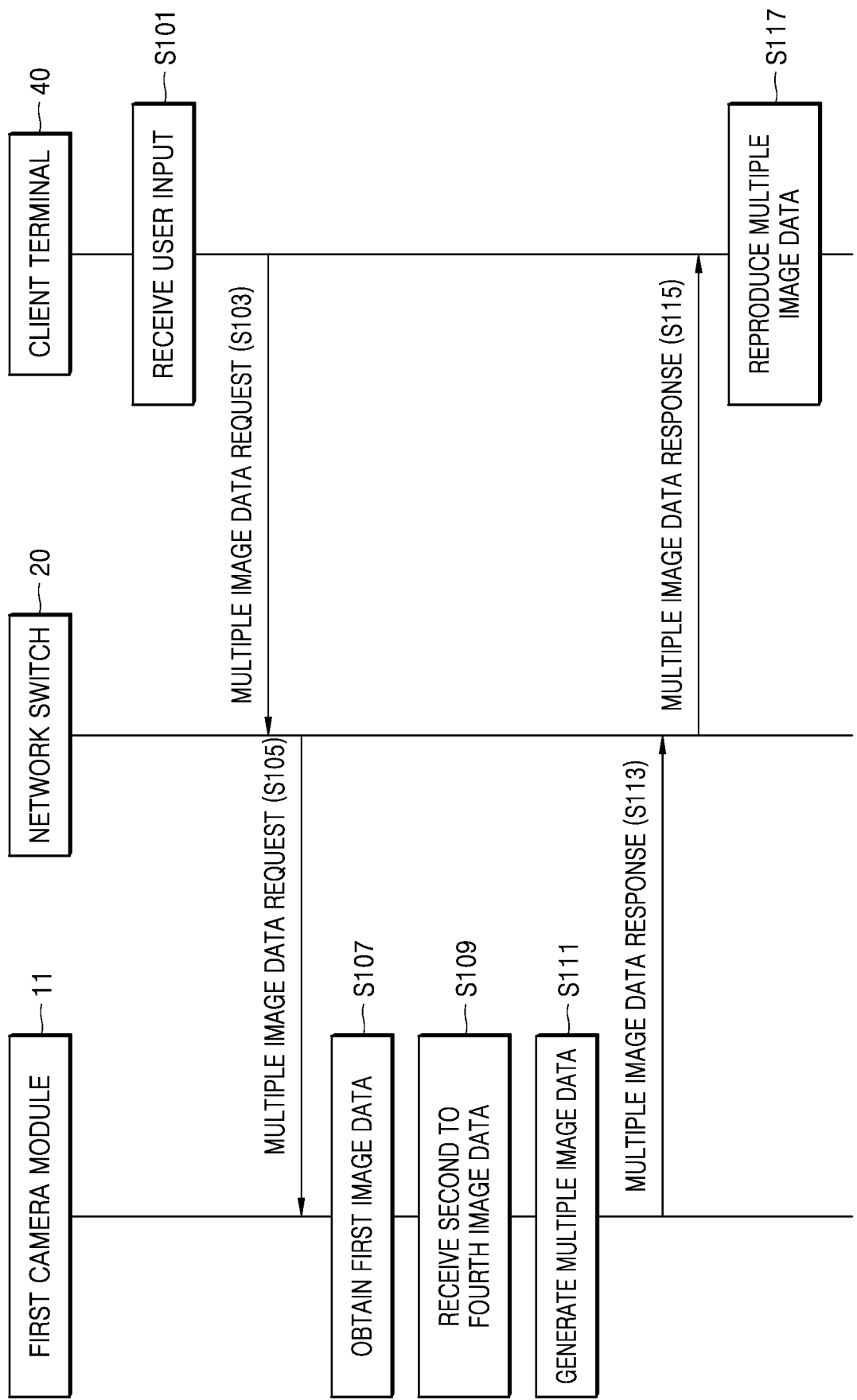
FIGS. 4 and 5 are flowcharts for describing a method of operating an image processing device according to embodiments.
Figure 5:
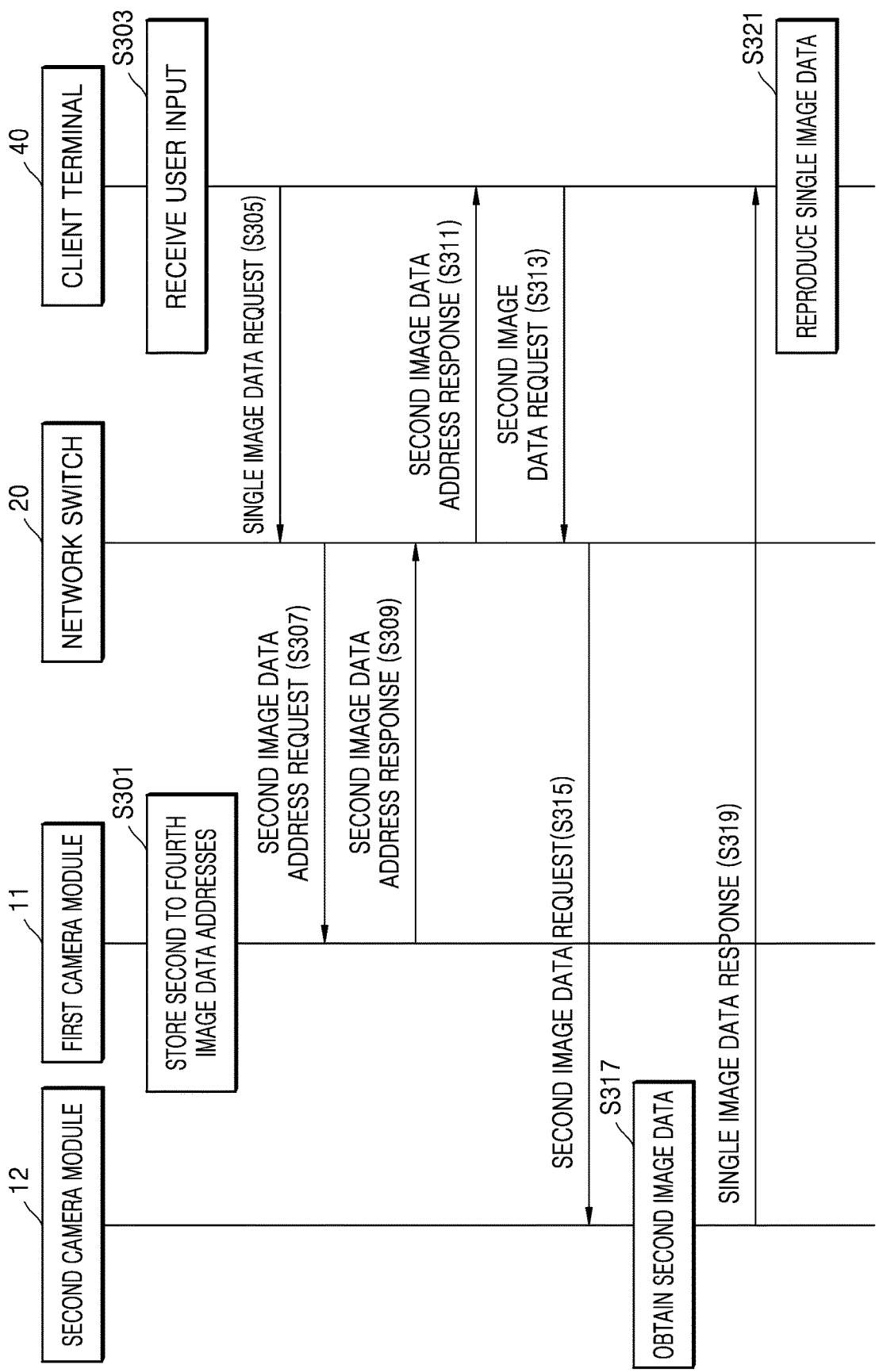

FIGS. 4 and 5 are flowcharts for describing a method of operating the image processing device 100 according to embodiments.

Referring to FIG. 3, the image processing device 100 according to an embodiment includes an image sensor 110, a first communication module 120, a first processor 130, and a first memory 140.

The image processing device 100 according to the embodiment of FIG. 3 may be implemented as the camera module 10 and the network switch 20 of FIG. 1.

For example, at least some of the image sensor 110, the first communication module 120, the first processor 130, and the first memory 140 of FIG. 3 may be implemented in a first camera module 11, and the other components may be implemented in the network switch 20.

Meanwhile, the image processing device 100 according to the embodiment of FIG. 3 may be implemented as the first camera module 11.

In other words, the image sensor 110, the first communication module 120, the first processor 130, and the first memory 140 of FIG. 3 may be included in the first camera module 11.

Hereinafter, the operation of the image processing device 100 according to an embodiment implemented in the first camera module 11 will be described in detail.

The image sensor 110 obtains image data by capturing images of a surveillance area. For example, the image sensor 110 may obtain first image data by capturing images of the surveillance area of the first camera module 11.

The first communication module 120 receives a plurality of pieces of image data from a plurality of camera modules 10. For example, the first communication module 120 may receive second to fourth image data from second to fourth camera modules 12 to 14.

The first communication module 120 receives a multiple image data request transmitted from the client terminal 40 and transmits a multiple image data response including multiple image data to the client terminal 40. At this time, the first communication module 120 may communicate with the client terminal 40 through the network switch 20.

The client terminal 40 may generate a multiple image data request by receiving a user input for receiving a plurality of images captured by images of one surveillance area in multiple directions. In other words, the multiple image data request may be, for example, a request for receiving first to fourth image data of the first to fourth camera modules 11 to 14 in one screen image.

The multiple image data request may include identification information indicating the network camera CAM.

The multiple image data responses may be generated in response to the multiple image data request. The multiple image data response may include multiple image data, identification information indicating the network camera CAM, etc.

The first processor 130 may generate multiple image data by scaling a plurality of pieces of image data in response to the multiple image data request and combining a plurality of pieces of scaled image data.

The first processor 130 may scale a plurality of pieces of image data to provide the plurality of pieces of image data in one screen image.

For example, the first processor 130 may scale the resolution of each of the first to fourth image data from 2 mega pixels to 0.5 mega pixels.

The first processor 130 may generate multiple image data by combining a plurality of pieces of image data to provide the plurality of pieces of image data at once. At this time, the first processor 130 may combine a plurality of scaled images.

For example, the first processor 130 may generate multiple image data having a resolution of 2 mega pixels by combining the first to fourth image data of which the resolutions are each scaled to 0.5 mega pixels.

The first processor 130 may generate a multiple image data response including multiple image data having the resolution of 2 mega pixels. At this time, the resolution of 2 mega pixels may be the resolution required by the client terminal 40. In other words, the first processor 130 may perform image processing such as scaling on the first to fourth image data to implement a resolution adaptive for the client terminal 40.

As such, according to the present embodiment, even a plurality of pieces of image data having high resolutions may be efficiently generated and transmitted through image processing such as scaling and combining.

The first memory 140 stores image data and an image data address.

For example, the first memory 140 may store the first to fourth image data and first to fourth image data addresses corresponding thereto.

When a single image data request indicating predetermined image data is received by the first communication module 120, the first processor 130 may extract a predetermined image data address stored in the first memory 140.

The single image data request may include identification information indicating predetermined image data. Identification information indicating predetermined image data may be identification information indicating a predetermined camera module 10, but is not limited thereto. For example, a single image data request may indicate second image data by including identification information indicating a second camera module 12.

The first processor 130 may generate a predetermined image data address response including a extracted predetermined image data address and may transmit the predetermined image data address response to the client terminal 40.

For example, when the first communication module 120 receives a single image data request indicating the second image data, the first processor 130 may extract a second image data address from the first memory 140, generate a second image data address response including the second image data address, and transmit the second image data address response to the client terminal 40.

The first communication module 120 may download an upgrade program from a server (not shown). At this time, the first processor 130 may upgrade each of the first to fourth camera modules 11 to 14 based on the upgrade program.

For example, the upgrade program may be a program for upgrading a profile related to image acquisition of the image sensor 110, a profile related to image processing of the camera module 10, an event detection function of the camera module 10, or a network connection function.

Referring to FIG. 4, when the client terminal 40 receives a user input (operation S101), the client terminal 40 transmits a multiple image data request to the network switch 20 (operation S103).

At this time, the user input may be, for example, an user input for receiving first to fourth image data of the first to fourth camera modules 11 to 14 in one screen image.

At this time, the multiple image data request may include identification information indicating the network camera CAM.

Subsequently, the network switch 20 transmits the multiple image data request to the first camera module 11 included in the network camera CAM (operation S105).

The first camera module 11 may be designated in advance as a master camera module of the network camera CAM.

Meanwhile, the first camera module 11 obtains first image data through the image sensor 110 (operation S107) and receives second to fourth image data from the second to fourth camera modules 12 to 14 through the first communication module 120 (operation S109).

The first camera module 11 generates multiple image data in response to the multiple image data request (operation S111).

At this time, the first camera module 11 may scale the first to fourth image data and combine scaled first to fourth image data to generate multiple image data.

The first image data obtained by the image sensor 110 and the second to fourth image data received through the first communication module 120 may each have image quality of, for example, a resolution of 2 mega pixels, a frame rate of 30 frames per second, and a bit rate of 2.5 megabits per second (bps).

The scaled first to fourth image data may each have, for example, a resolution of 0.5 mega pixels and a frame rate of 30 fps.

The multiple image data is a result of encoding after the scaled first to fourth image data are combined, and may have the quality of a resolution of 2 mega pixels, a frame rate of 30 fps, and a bit rate of 2.5 mega bps.

When the first camera module 11 transmits a multiple image data response including the multiple image data to the network switch 20 (operation S113), the network switch 20 transmits the multiple image data response to the client terminal 40 (operation S115).

Subsequently, the client terminal 40 reproduces the multiple image data through a screen (operation S117).

At this time, the client terminal 40 may reproduce the multiple image data having the quality of a resolution of 2 mega pixels, a frame rate of 30 fps, and a bit rate of 2.5 mega bps.

As described above, according to the present embodiment, by controlling the operation of the camera module 10 provided in the network camera CAM and selecting a master camera module to process a plurality of pieces of image data simultaneously, limited resources may be efficiently utilized, and thus the performance of the surveillance system 1 according to an embodiment may be improved.

Referring to FIG. 5, the first camera module 11, which is the master camera module, stores second to fourth image data addresses in the first memory 140 (operation S301).

In other words, the first camera module 11 may store not only the first image data address corresponding to the first image data obtained by itself, but also the second to fourth image data addresses received from the second to fourth camera modules 12 to 14 in the first memory 140.

Meanwhile, when the client terminal 40 receives a user input indicating the second image data (operation S303), the client terminal 40 transmits a single image data request indicating the second image data to the network switch 20 (operation S305).

At this time, the single image data request may include identification information indicating the second camera module 12.

The network switch 20 transmits a second image data address request to the first camera module 11 (operation S307) and receives a second image data address response from the first camera module 11 (operation S309). At this time, the second image data address request does not include an RTSP address of the second image data, whereas the second image data address response may include the RTSP address of the second image data.

The network switch 20 transmits the second image data address response to the client terminal 40 (operation S311) and receives a second image data request from the client terminal 40 (operation S313). At this time, the second image data request may include the RTSP address of the second image data.

The network switch 20 transmits the second image data request to the second camera module 12 (operation S315).

At this time, the network switch 20 may transmit the second image data request to the second camera module 12 based on the RTSP address of the second image data included in the second image data request.

Meanwhile, the second camera module 12 obtains second image data (operation S317) and transmits a single image data response including the second image data to the client terminal 40 (operation S319).

The client terminal 40 reproduces the single image data (operation S321). At this time, the client terminal 40 may reproduce the second image data having the quality of a resolution of 2 mega pixels, a frame rate of 30 fps, and a bit rate of 2.5 mega bps.

As described above, according to the present embodiment, since the first camera module 11 functions as the master camera module, multiple image data and single image data may be freely provided, thereby providing user convenience.

Hereinafter, descriptions identical to those given above will be omitted or briefly given.

Next, with reference to FIG. 6, the overall operation of a surveillance system 1' according to another embodiment will be described.

Figure 6:
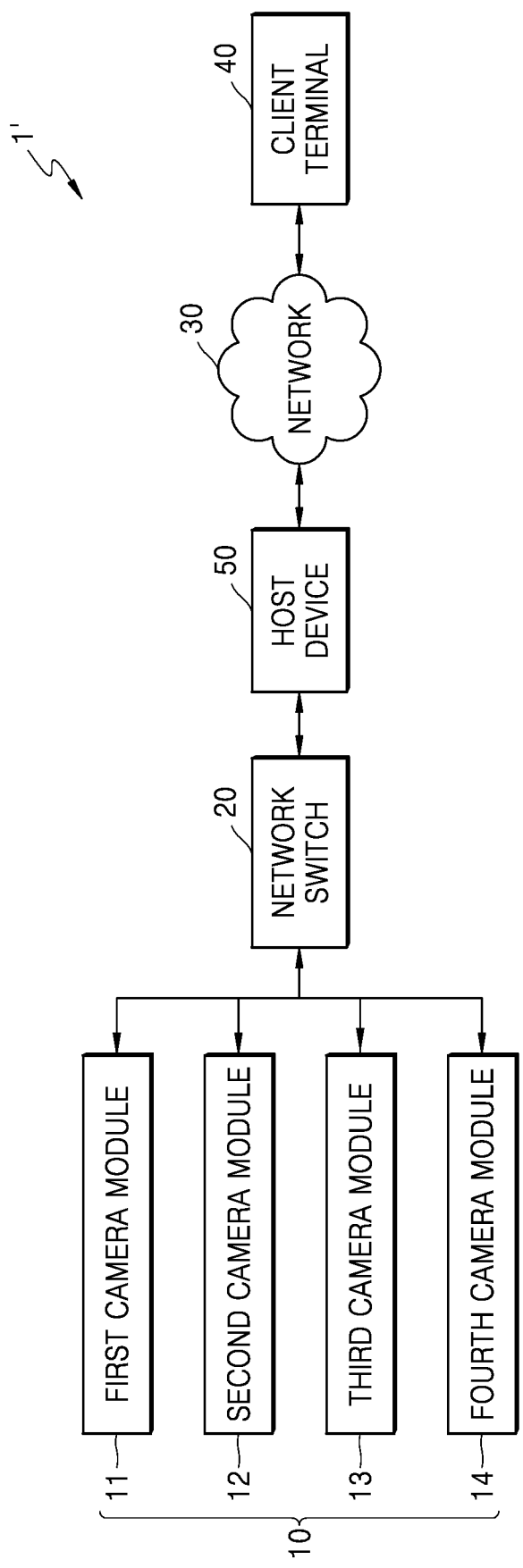
FIG. 6 is a diagram for explaining a surveillance system according to another embodiment.

FIG. 6 is a diagram for explaining the surveillance system 1' according to another embodiment.

Referring to FIG. 6, the surveillance system 1' according to another embodiment includes the camera module 10, the network switch 20, the network 30, the client terminal 40, and a host device 50.

The surveillance system 1' according to another embodiment may provide a configuration that, when information of the camera module 10 collected by the host device 50 through the network switch 20 is transmitted to the client terminal 40 through the network 30, a user may monitor information transmitted to the client terminal 40.

One or more camera modules 10 may be provided.

The camera module 10 may obtain image data through an image sensor, encode obtained image data, and transmit encoded image data to the host device 50 through the network switch 20.

The network switch 20 transmits a plurality of pieces of image data received from a plurality of camera modules 10 to the host device 50. At this time, the plurality of pieces of image data transmitted and received through the network switch 20 may be data respectively encoded by the plurality of camera modules 10.

For example, the network switch 20 may transmit encoded first to fourth image data received from the first to fourth camera modules 11 to 14 to the host device 50. At this time, the encoded first to fourth image data may not be combined and may be separated from one another.

The network switch 20 may operate as an IP router for the plurality of camera modules 10. In other words, the plurality of camera modules 10 may share one IP address. Therefore, the client terminal 40 may access a plurality of pieces of image data obtained by the plurality of camera modules 10 using one IP address.

The network 30 may include a wired network or a wireless network. The client terminal 40 may transmit and receive data to and from the host device 50 through the network 30.

The client terminal 40 may display and store image data transmitted from the host device 50.

The client terminal 40 may receive a user input and transmit the user input to the host device 50.

The host device 50 receives a plurality of pieces of image data obtained by the plurality of camera modules 10 from the network switch 20 and transmits multiple image data generated by combining the plurality of pieces of image data to one another to the client terminal 40 according to a user's request.

For example, the host device 50 may decode encoded first to fourth image data received from the network switch 20, scale decoded first to fourth image data, generate multiple image data by combining scaled first to fourth image data, encode the multiple image data, and transmit encoded multiple image data to the client terminal 40.

When an operation error is detected, the host device 50 may select one camera module 10 from among the plurality of camera modules 10 as a master camera module and set authorization to the master camera module to perform the operation of the host device 50.

For example, when it is determined that the operation of the host device 50 is impossible due to an overload or an external attack, the host device 50 may select the first camera module 11 from among the plurality of camera modules 10 as the master camera module and transmit a network service provision request to the first camera module 11, thereby transferring authorization for providing multiple image data to the first camera module 11.

Meanwhile, the host device 50 may perform a reboot by itself after transferring authorization for providing multiple image data to the first camera module 11. The host device 50 that is successfully rebooted may thereafter perform a function of providing a path to access the network camera CAM together with the network switch 20.

According to the present embodiment, even when an error occurs in the operation of any one camera module 10, the host device 50 collects and provides image data from the other normally operating camera modules 10, thereby providing the surveillance system 1' according to another embodiment that is highly error-resistant.

Also, when an error occurs in the operation of the host device 50 itself, authorizations may be set to the camera module 10 to collect and provide image data, thereby providing the surveillance system 1' according to another embodiment that is highly error-resistant.

Figure 7:
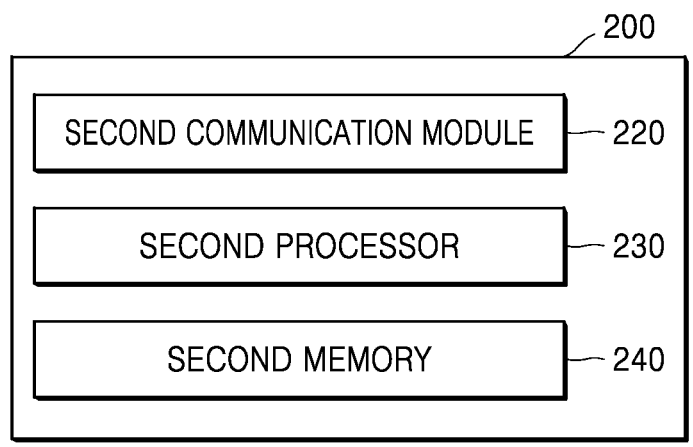
FIG. 7 is a block diagram showing the configuration of an image processing device according to another embodiment.

FIG. 7 is a block diagram showing the configuration of an image processing device 200 according to another embodiment.

Figure 8:
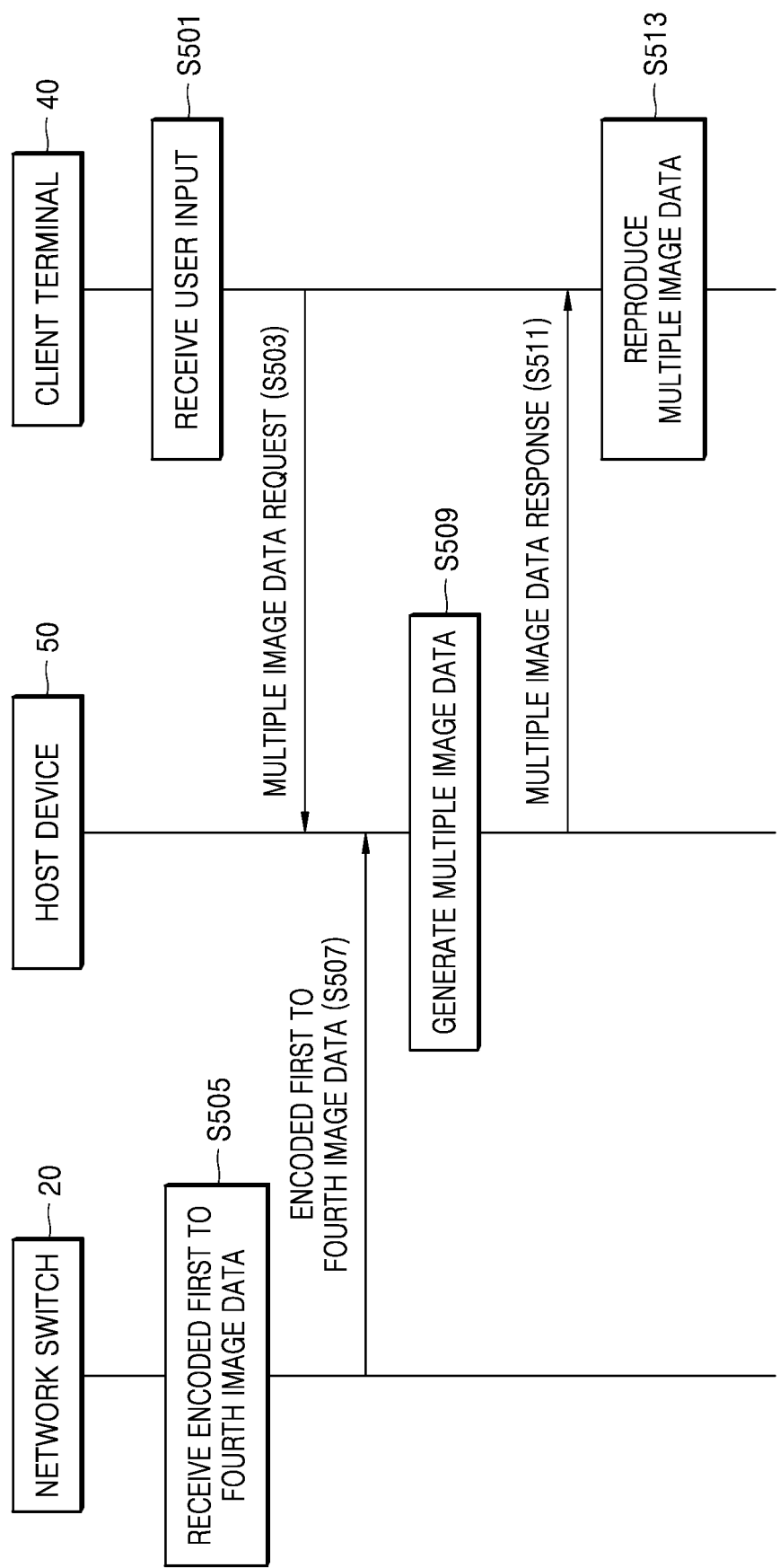
FIGS. 8 to 10 are flowcharts for describing a method by which an image processing device generates multiple pieces of image data according to another embodiment.
Figure 9:
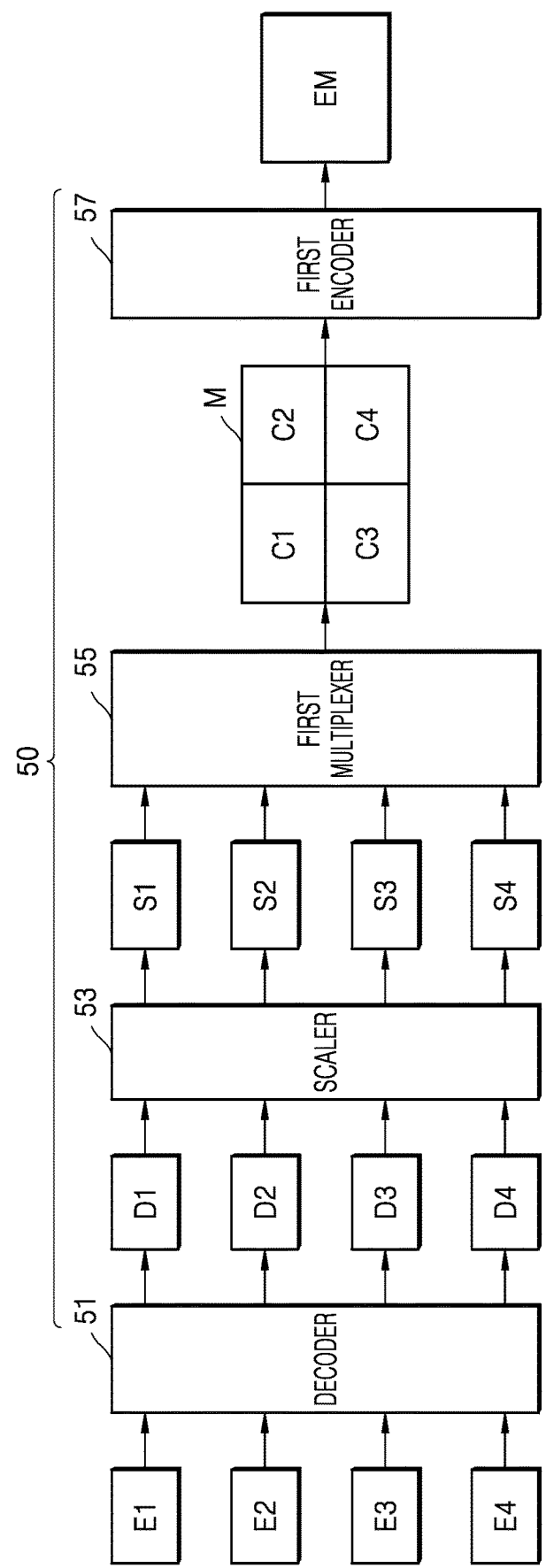
Figure 10:
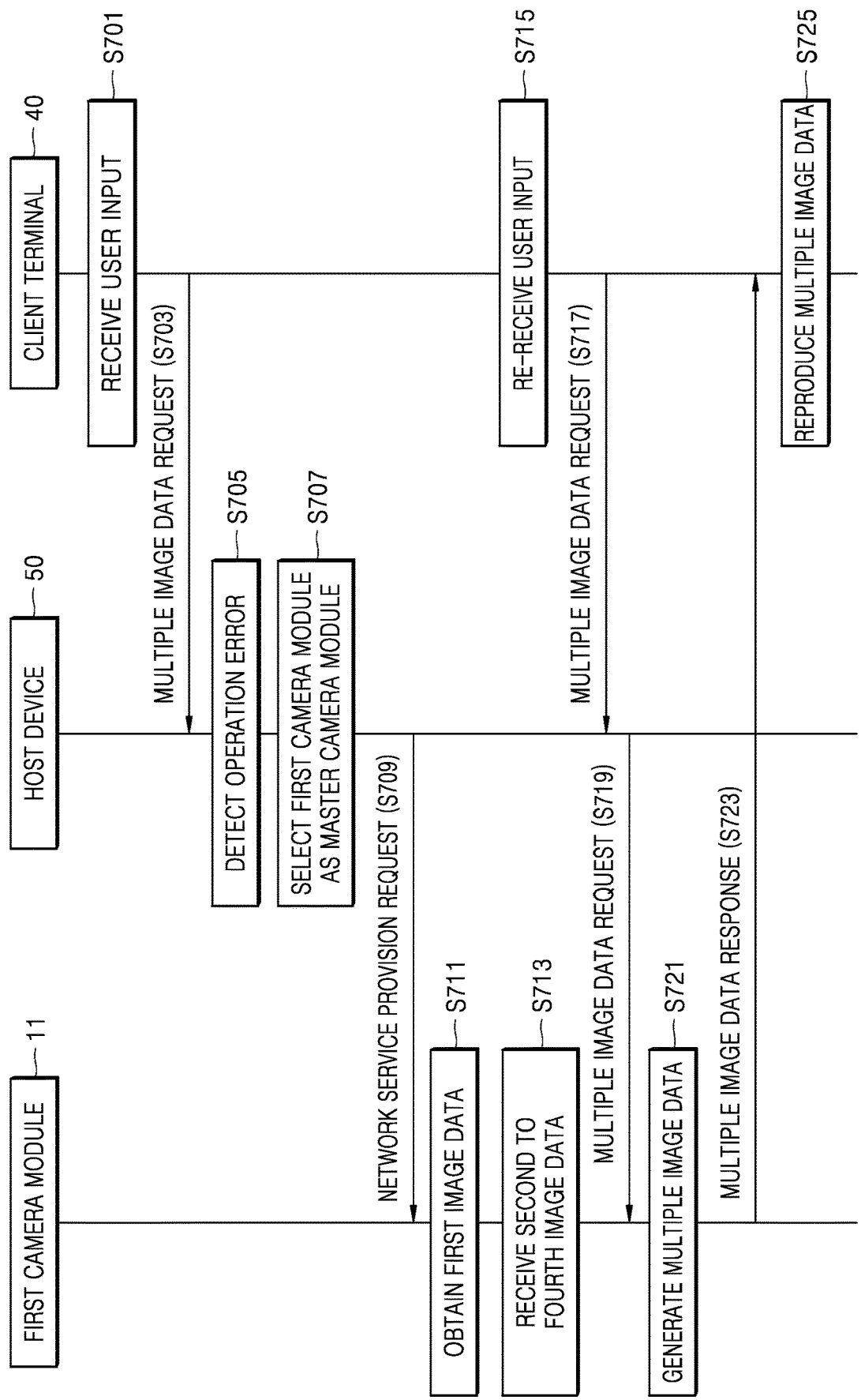

FIGS. 8 to 10 are flowcharts for describing a method by which the image processing device 200 generates multiple image data according to another embodiment.

Referring to FIG. 7, the image processing device 200 according to another embodiment includes a second communication module 220, a second processor 230, and a second memory 240.

The image processing device 200 according to another embodiment of FIG. 7 may be implemented as the host device 50 of FIG. 6. In other words, the second communication module 220, the second processor 230, and the second memory 240 of FIG. 7 may be included in the host device 50.

Hereinafter, the operation of the image processing device 200 according to another embodiment implemented in the host device 50 will be described.

The second communication module 220 receives a plurality of pieces of image data obtained by the plurality of camera modules 10, receives a multiple image data request transmitted from the client terminal 40, and transmits a multiple image data response including multiple image data to the client terminal 40.

In detail, the second communication module 220 may receive a plurality of pieces of image data encoded by the plurality of camera modules 10 from the network switch 20.

For example, the second communication module 220 may receive encoded first to fourth image data from the network switch 20. In this case, the encoded first to fourth image data may each have 2 mega pixels resolution.

The multiple image data request may be a request for simultaneously receiving a plurality of pieces of image data obtained by one network camera CAM.

For example, the multiple image data request may be a request for receiving first to fourth image data of the first to fourth camera modules 11 to 14 in one screen image.

The second processor 230 generates multiple image data by scaling a plurality of pieces of image data in response to the multiple image data request and combining a plurality of pieces of scaled image data.

In detail, the second processor 230 includes a decoder 51, a scaler 53, a first multiplexer 55, and a first encoder 57.

The decoder 51 may decode a plurality of pieces of encoded image data, the scaler 53 may scale a plurality of pieces of decoded image data, the first multiplexer 55 may generate multiple image data by combining a plurality of pieces of scaled image data, and the first encoder 57 may encode the multiple image data.

For example, the decoder 51 may decode encoded first to fourth image data, and the scaler 53 may scale decoded first to fourth image data.

At this time, the scaler 53 may scale a plurality of pieces of decoded image data, such that the sum of the resolutions of the plurality of pieces of scaled image data is adaptive for a resolution required by the client terminal 40.

For example, the scaler 53 may scale the plurality of pieces of decoded image data, such that the sum of the resolutions of the plurality of pieces of scaled image data is lower than or equal to the resolution required by the client terminal 40.

The resolution required by the client terminal 40 may be the highest resolution that may be displayed by the client terminal 40 or may be a resolution set by a user input, but is not limited thereto.

For example, the resolution required by the client terminal 40 may be 2 mega pixels, and the scaled first to fourth image data may each have a resolution of 0.5 mega pixels.

The first multiplexer 55 may combine the plurality of pieces of scaled image data to generate one multiple image data. The one multiple image data may refer to image data that may be displayed in one screen.

The first encoder 57 may encode multiple image data.

At this time, the resolution of encoded multiple image data may satisfy the resolution required by the client terminal 40. In other words, the resolution of encoded multiple image data may lower than or equal to the resolution required by the client terminal 40.

For example, the encoded multiple image data may each have a resolution of 2 mega pixels.

The second processor 230 may include the multiple image data encoded by the first encoder 57 in a multiple image data response.

As described above, according to the present embodiment, by processing a plurality of pieces of image data having high resolutions through the host device 50 provided separately from the camera module 10, the surveillance system 1' according to another embodiment with high performance may be provided.

Meanwhile, when an operation error of the host device 50 is detected, the second processor 230 may select one camera module 10 from among the plurality of camera modules 10 as a master camera module.

For example, the second processor 230 may select the first camera module 11 as the master camera module from among the first to fourth camera modules 11 to 14 in response to an operation error of the host device 50.

When an operation error of the master camera module is detected, the second processor 230 may re-select one camera module 10 from among the remaining camera modules 10 as the master camera module.

For example, when the second processor 230 receives a message about an operation error such as a request to stop a network service from the first camera module 11, the second processor 120 may select a second camera module 12 from among the second to fourth camera modules 12 to 14 as the master camera module.

At this time, the second processor 230 may select the camera module 10 of the predetermined highest priority from among the plurality of camera modules 10 or the camera module 10 with the least load from among the plurality of camera modules 10 as the master camera module.

The camera module 10 with the least load from among the plurality of camera modules 10 may be the camera module 10 with the least load when an operation error of the host device 50 is detected or the camera module 10 with the least load measured during a predetermined period, but is not limited thereto.

When the master camera module is selected by the second processor 230, the second communication module 220 may transmit a network service provision request to the master camera module.

The network service provision request may be a request for a network service providing operation performed by the host device 50. For example, the network service provision request may include at least one of a request for image transmission performed by the second communication module 220 and a request for image processing performed by the second processor 230.

The master camera module may perform functions of the second communication module 220 and the second processor 230 in response to a network service provision request. In other words, the master camera module may efficiently process high-resolution image data by performing the operation of the first camera module 11 described above with reference to FIGS. 1 to 5 in response to a network service provision request.

The second memory 240 may store data received through the second communication module 220 and/or data processed by the second processor 230.

The second memory 240 may store an upgrade program downloaded from a server (not shown).

According to the present embodiment, even when an operation error of the camera module 10 or the host device 50 is detected, high-resolution image data obtained by the camera module 10 may be processed and provided to a user.

Referring to FIG. 8, the host device 50 receives a multiple image data request from the client terminal 40 through the second communication module 220.

In detail, when the client terminal 40 receives a user input for receiving a plurality of images on one screen (operation S501), the client terminal 40 transmits a multiple image data request to the host device 50 (operation S503).

At this time, the multiple image data request may include identification information indicating the network camera CAM provided with the first to fourth camera modules 11 to 14.

Meanwhile, the host device 50 receives a plurality of pieces of image data obtained by the plurality of camera modules 10 through the second communication module 220.

Here, the plurality of camera modules 10 shares one IP address. For example, the first to fourth camera modules 11 to 14 constituting one network camera CAM may share one IP address.

Specifically, the network switch 20 receives encoded first to fourth image data from the first to fourth camera modules 11 to 14 (operation S505) and transmits the encoded first to the fourth image data to the host device 50 (operation S507).

Subsequently, the host device 50 generates multiple image data in response to the multiple image data request (operation S509).

In detail, the host device 50 generates multiple image data by scaling a plurality of pieces of image data in response to the multiple image data request and combining a plurality of pieces of scaled image data, through the second processor 230.

Referring to FIG. 9, the second processor 230 of the host device 50 may include the decoder 51, the scaler 53, the first multiplexer 55, and the first encoder 57.

For example, the client terminal 40 may request multiple image data having the quality of a resolution of 2 mega pixels, a frame rate of 30 fps, and a bit rate of 2.5 mega bps.

The decoder 51 may decode encoded first image data E1, encoded second image data E2, encoded third image data E3, and encoded fourth image data E4 to output decoded first image data D1, decoded second image data D2, decoded third image data D3 and decoded fourth image data D4, respectively.

Here, for example, encoded first to fourth image data E1 to E4 and decoded first to fourth image data D1 to D4 may each have the quality of a resolution of 2 mega pixels, a frame rate of 30 fps, and a bit rate of 2.5 mega bps.

The scaler 53 may scale the decoded first image data D1, the decoded second image data D2, the decoded third image data D3, and the decoded fourth image data D4 to output scaled first image data S1, scaled second image data S2, scaled third image data S3, and scaled fourth image data S4, respectively.

In this case, scaled first to fourth image data S1 to S4 may each have the quality of a resolution of 0.5 mega pixels and a frame rate of 30 fps, for example.

The first multiplexer 55 may generate multiple image data M by combining the scaled first image data S1, the scaled second image data S2, the scaled third image data S3, and the scaled fourth image data S4.

At this time, combined first image data C1, combined second image data C2, combined third image data C3, and combined fourth image data C4 constituting the multiple image data M may each have, for example, the quality of a resolution of 0.5 mega pixels and a frame rate of 30 fps.

The first encoder 57 may encode the multiple image data M and generate encoded multiple image data EM.

At this time, the encoded multiple image data EM may have, for example, the quality of a resolution of 2 mega pixels, a frame rate of 30 fps, and a bit rate of 2.5 mega bps.

As a result, the image quality of the encoded multiple image data EM may satisfy the image quality required by the client terminal 40.

Referring back to FIG. 8, when the host device 50 transmits a multiple image data response including multiple image data to the client terminal 40 through the second communication module 220 (operation S511), the client terminal 40 reproduces the multiple image data on one screen (operation S513).

Referring to FIG. 10, when the client terminal 40 receives a user input (operation S701), the client terminal 40 transmits a multiple image data request to the host device 50 (operation S703).

Meanwhile, when an operation error of the host device 50 is detected, the host device 50 selects the first camera module 11 from among the plurality of camera modules 10 as a master camera module.

The host device 50 may detect an error when a problem is detected in image reception and/or processing.

For example, the host device 50 may detect an error when image data is not received from the camera module 10 for a predetermined time period.

The host device 50 may also detect an error when, for example, the host device 50 is unable to decode a plurality of pieces of image data, is unable to scale a plurality of pieces of decoded image data, is unable to combine a plurality of pieces of scaled image data, or is unable to encode multiple image data.

The host device 50 may select the first camera module 11 from among the first to fourth camera modules 11 to 14 as a master camera module. In this case, the first camera module 11 may be the camera module 10 of the predetermined highest priority or the camera module 10 with the least load from among the first to fourth camera modules 11 to 14, but is not limited thereto.

Subsequently, the host device 50 transmits a network service provision request to the first camera module 11, which is the master camera module (operation S709).

The first camera module 11, which received the network service provision request, obtains first image data (operation S711) and receives second to fourth image data from the second to fourth camera modules 12 to 14 (operation S713).

When the client terminal 40 receives a user input again (operation S715), the client terminal 40 transmits a multiple image data request to the host device 50 (operation S717).

The host device 50 forwards the multiple image data request received from the client terminal 40 to the first camera module 11 (operation S719).

The first camera module 11 generates multiple image data by combining the first to fourth image data in response to the multiple image data request (operation S721).

The first camera module 11 transmits a multiple image data response including the multiple image data to the client terminal 40 (operation S723), and the client terminal 40 reproduces the multiple image data as one screen (operation S725).

Next, with reference to FIG. 11, the overall operation of a surveillance system 1" according to another embodiment will be described.

Figure 11:
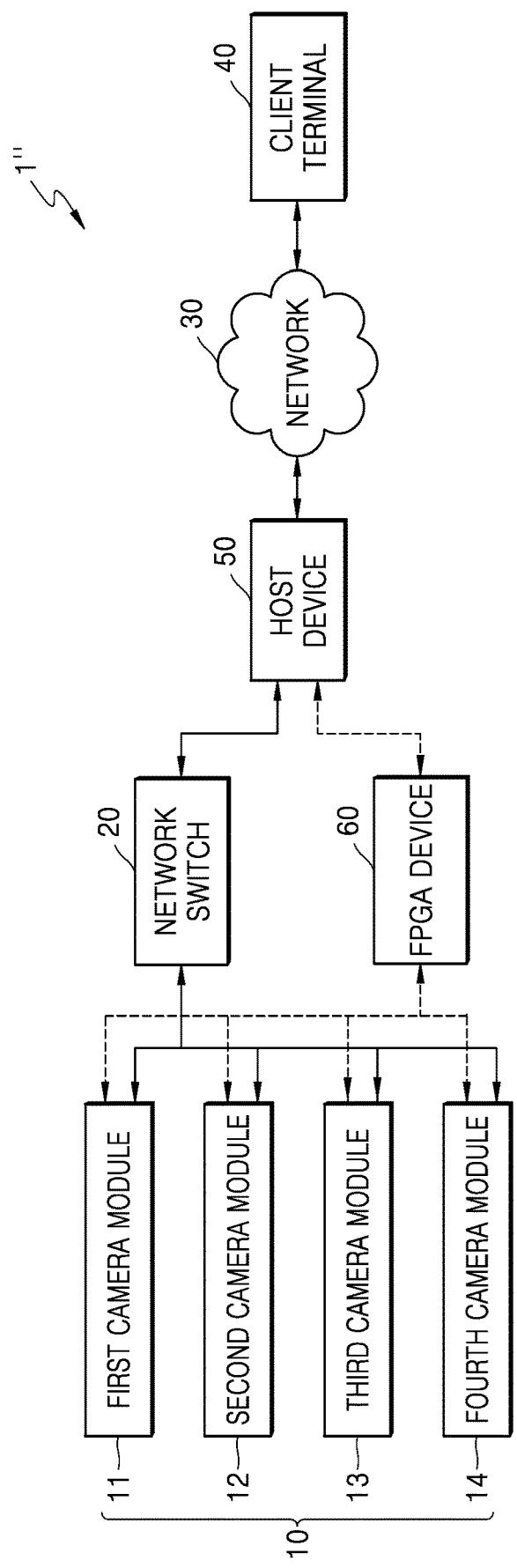
FIG. 11 is a diagram for explaining a surveillance system according to another embodiment.

FIG. 11 is a diagram for explaining the surveillance system 1" according to another embodiment.

Referring to FIG. 11, the surveillance system 1" according to another embodiment includes the camera module 10, the network switch 20, the network 30, the client terminal 40, the host device 50, and a field programmable gate array (FPGA) device 60.

The surveillance system 1" according to another embodiment may provide a configuration that, when information regarding the camera module 10 collected by the FPGA device 60 is transmitted to the client terminal 40 through the host device 50 and the network 30, a user may monitor information transmitted to the client terminal 40.

The camera module 10 may transmit image data in a raw data state obtained by the image sensor to the FPGA device 60. Hereinafter, image data in a raw data state will be referred to as raw image data.

The camera module 10 may be connected to the FPGA device 60 via a wire. In other words, the FPGA device 60 may receive image data of the camera module 10 quickly and efficiently by receiving raw image data from the camera module 10 connected via a wire.

Also, the FPGA device 60 may prevent a time difference between a plurality of pieces of image data by receiving a plurality of pieces of raw image data from the plurality of camera modules 10.

Meanwhile, the camera module 10 encodes image data and transmits encoded image data to the network switch 20. The network switch 20 forwards the encoded image data received from the camera module 10 to the host device 50.

The FPGA device 60 may generate multiple image data by scaling a plurality of pieces of raw image data and combining a plurality of pieces of scaled raw image data.

In detail, the FPGA device 60 may scale the plurality of pieces of raw image data, such that the sum of the resolutions of the plurality of pieces of scaled raw image data is lower than or equal to the resolution required by the client terminal 40. At this time, when the sum of the resolutions of the plurality of pieces of raw image data is lower than or equal to the resolution required by the client terminal 40, the FPGA device 60 may omit scaling.

The FPGA device 60 may transmit the multiple image data to the host device 50.

The host device 50 receives the multiple image data from the FPGA device 60, receives a multiple image data request from the client terminal 40, and transmits a multiple image data response including the multiple image data to the client terminal 40.

The host device 50 may encode the multiple image data received from the FPGA device 60. In other words, the host device 50 does not need to perform decoding or scaling.

Meanwhile, the host device 50 may transmit encoded image data received from the network switch 20 to the client terminal 40.

For example, when the host device 50 receives a single image data request indicating second image data from the client terminal 40, the host device 50 may transmit encoded second image data received from the network switch 20 to the client terminal 40. At this time, the host device 50 does not need to perform encoding.

According to the present embodiment, since the load of the host device 50 is reduced, the surveillance system 1') according to another embodiment with improved efficiency may be provided.

Figure 12:
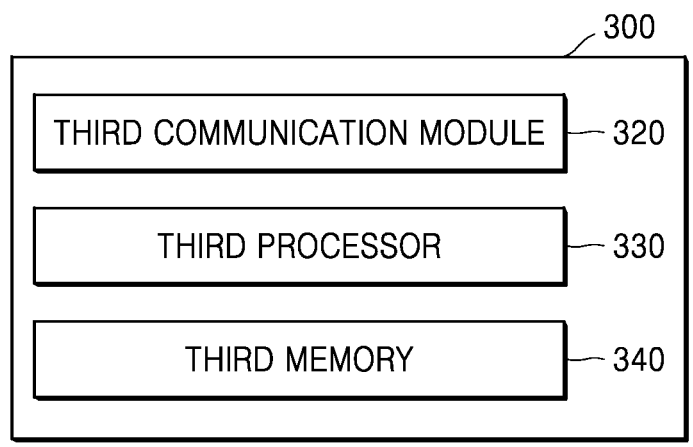
FIG. 12 is a block diagram showing the configuration of an image processing device according to another embodiment.

FIG. 12 is a block diagram showing the configuration of an image processing device according to another embodiment.

Referring to FIG. 12, an image processing device 300 according to another embodiment includes a third communication module 320, a third processor 330, and a third memory 340.

The image processing device 300 of FIG. 12 may be implemented as the host device 50 of FIG. 11. In other words, the third communication module 320, the third processor 330, and the third memory 340 of FIG. 12 may be included in the host device 50.

Hereinafter, the operation of the image processing device 300 according to another embodiment implemented in the host device 50 will be described.

The third communication module 320 receives the multiple image data from the FPGA device 60, receives a multiple image data request from the client terminal 40, and transmits a multiple image data response including the multiple image data to the client terminal 40.

In detail, the third communication module 320 may receive multiple image data generated by combining a plurality of pieces of raw image data obtained by the plurality of camera modules 10 from the FPGA device 60.

In this case, since the multiple image data is image data that is decoded, scaled, and multiplexed by the FPGA device 60, decoding, scaling, and multiplexing need not be performed by the image processing device 300.

The third processor 330 encodes the multiple image data received from the FPGA device 60. Therefore, the multiple image data included in a multiple image data response may be the multiple image data encoded by the third processor 330.

Meanwhile, the third processor 330 does not need to encode the multiple image data received from the network switch 20.

The third memory 340 may store data received through the third communication module 320 and/or data processed by the third processor 330.

The third memory 340 may store an upgrade program downloaded from a server (not shown).

As described above, according to the present embodiment, as the function of the third processor 330 of the host device 50 is reduced, the image processing speed of the host device 50 is increased, and thus the performance of the surveillance system 1" according to another embodiment may be improved.

Figure 13:
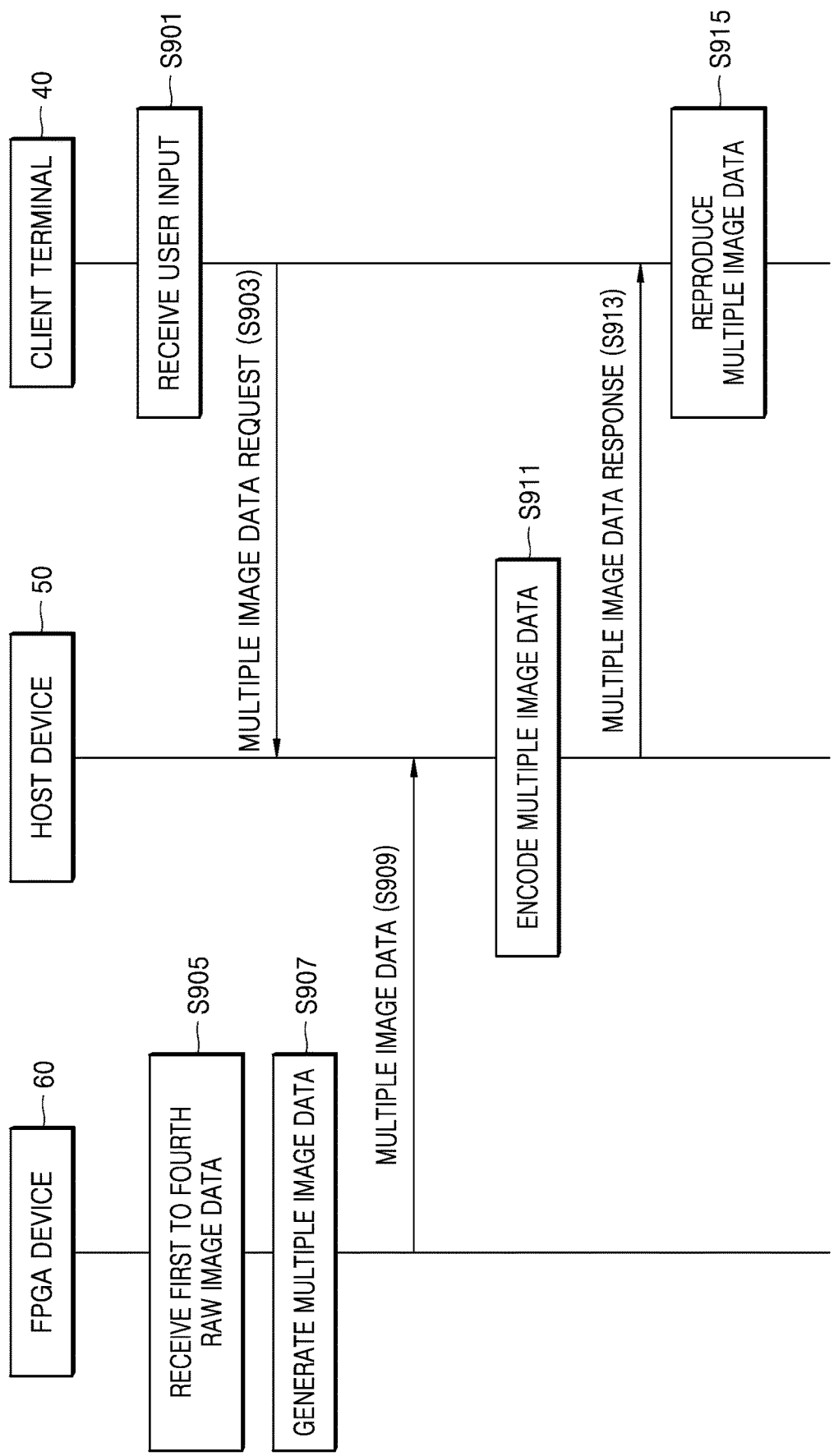
FIGS. 13 and 14 are flowcharts for describing a method by which an image processing device generates multiple pieces of image data according to another embodiment.
Figure 14:
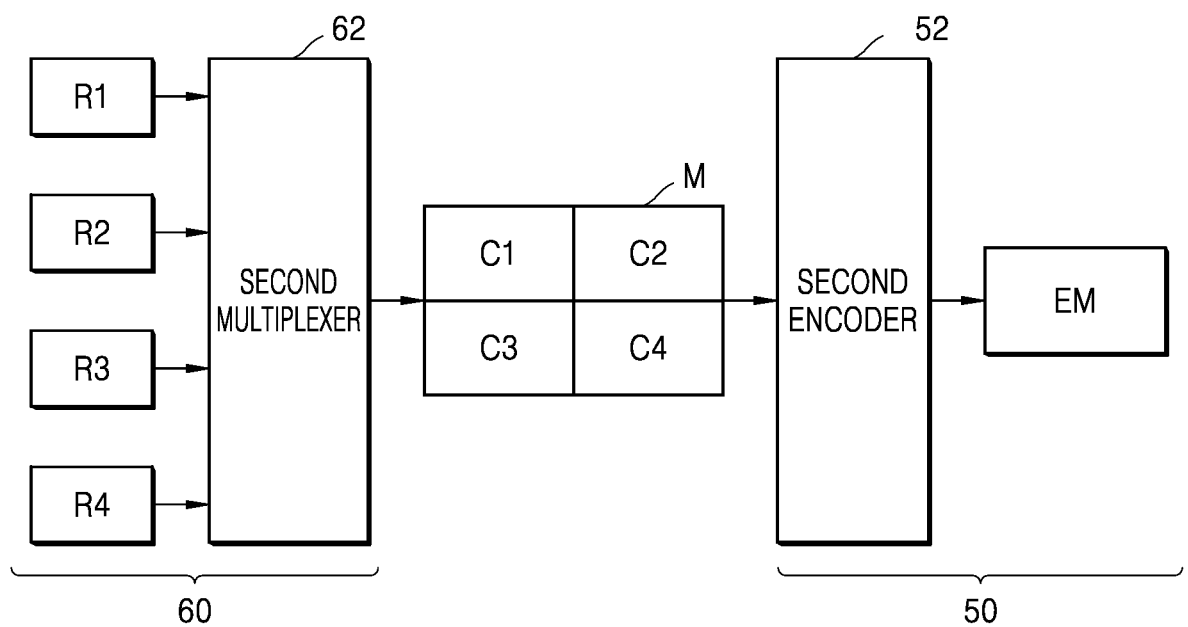

FIGS. 13 and 14 are flowcharts for describing a method by which an image processing device generates multiple image data according to another embodiment.

Referring to FIG. 13, when the client terminal 40 receives a user input (operation S901), the client terminal 40 transmits a multiple image data request to the host device 50 (operation S903).

Meanwhile, the FPGA device 60 receives a plurality of pieces of raw image data from the plurality of camera modules 10.

In detail, the FPGA device 60 receives first to fourth raw image data from the first to fourth camera modules 11 to 14 (operation S905) and generates multiple image data by combining the first to fourth raw image data (operation S907).

At this time, the FPGA device 60 may scale the first to fourth raw image data based on a resolution required by the client terminal 40 and generate the multiple image data by combining scaled first to fourth raw image data.

Next, the FPGA device 60 transmits the multiple image data to the host device 50 (operation S909).

The host device 50 encodes the multiple image data received from the FPGA device 60 (operation S911).

At this time, encoded multiple image data EM may have, for example, the quality of a resolution of 2 mega pixels, a frame rate of 30 fps, and a bit rate of 2.5 mega bps.

Referring to FIG. 14, the FPGA device 60 may include a second multiplexer 62, and the host device 50 may include a second encoder 52.

For example, the client terminal 40 may request multiple image data having the quality of a resolution of 2 mega pixels, a frame rate of 30 fps, and a bit rate of 2.5 mega bps.

The FPGA device 60 may receive first to fourth raw image data R1 to R4 having the quality of a resolution of 0.5 mega pixels and a frame rate of 30 fps from the first to fourth camera modules 11 to 14.

The second multiplexer 62 of the FPGA device 60 may generate the multiple image data M by combining first raw image data R1, second raw image data R2, third raw image data R3, and fourth raw image data R4.

At this time, multiple image data M may have, for example, the quality of a resolution of 2 mega pixels, a frame rate of 30 fps, and a bit rate of 2.5 mega bps.

The second encoder 52 of the host device 50 may generate encoded multiple image data EM by encoding the multiple image data M received from the FPGA device 60.

At this time, the encoded multiple image data EM may have, for example, the quality of a resolution of 2 mega pixels, a frame rate of 30 fps, and a bit rate of 2.5 mega bps.

As a result, the image quality of the encoded multiple image data EM may satisfy the image quality required by the client terminal 40.

Referring back to FIG. 13, when the host device 50 transmits a multiple image data response including multiple image data to the client terminal 40 (operation S913), the client terminal 40 reproduces the multiple image data on one screen (operation S915).

At this time, the client terminal 40 may reproduce multiple image data encoded by the host device 50.

While the disclosure has been particularly shown and described with reference to preferred embodiments thereof. It will be understood by those skilled in the art that various changes in form and details may be made therein without departing from the spirit and scope of the disclosure as defined by the appended claims.

The preferred embodiments should be considered in descriptive sense only and not for purposes of limitation. Therefore, the scope of the disclosure is defined not by the detailed description of the disclosure but by the appended claims, and all differences within the scope will be construed as being included in the disclosure.

INDUSTRIAL APPLICABILITY

The disclosure is likely to be used in various types of security systems.

The invention claimed is:

1. An image processing device of a host device comprising:
a communication module configured to
receive a plurality of pieces of image data obtained by a plurality of camera modules, wherein the plurality of camera modules constitute one network camera,
receive a multiple image data request from a client terminal, wherein the multiple image data request is a request for simultaneously receiving the plurality of pieces of image data by the one network camera, and
based on an operation error of the host device not being detected, transmit a multiple image data response comprising multiple image data to the client terminal; and
a processer configured to:
based on the operation error of the host device not being detected:
generate the multiple image data by scaling the plurality of pieces of image data in response to the multiple image data request and combining a plurality of pieces of scaled image data;
based on the operation error of the host device being detected:
select one camera module as a master camera module from among the plurality of camera modules;
enable the master camera module to perform a function of the communication module or a function of the processor in response to a network service provision request being received by the master camera module from the communication module; and
reboot the host device and provide a path to access the network camera after the network service provision request is transmitted to the master camera module,
wherein the plurality of camera modules share one internet protocol (IP) address.

2. The image processing device of claim 1, wherein the communication module is further configured to:
receive the plurality of pieces of image data from the plurality of camera modules that are mounted in the one network camera and face in a plurality of different directions;
receive, from the client terminal, the multiple image data request that requests the one network camera to simultaneously transmit the plurality of pieces of image data that are obtained by capturing scenes in the plurality of different directions; and
in response to the multiple image data request, transmit the multiple image data comprising the plurality of pieces of image data, to the client terminal.

3. The image processing device of claim 1, wherein the communication module receives the plurality of pieces of image data encoded by the plurality of camera modules from a network switch.

4. The image processing device of claim 3, wherein the processor comprises:
a decoder configured to decode the plurality of pieces of image data;
a scaler configured to scale a plurality of pieces of decoded image data;
a multiplexer configured to generate the multiple image data by combining the plurality of pieces of scaled image data; and
an encoder configured to encode the multiple image data, wherein the processor includes the multiple image data encoded by the encoder in the multiple image data response.

5. The image processing device of claim 4, wherein the scaler scales the plurality of pieces of decoded image data, such that a sum of resolutions of the plurality of pieces of scaled image data is lower than or equal to a resolution required by the client terminal.

6. The image processing device of claim 1, wherein when the processor detects the operation error of the host device,
the communication module transmits the network service provision request to the master camera module, and
the master camera module performs the function of the communication module of transmitting the multiple image data response to the client terminal and the function of the processor of generating the multiple image data by scaling the plurality of pieces of image data, in response to the network service provision request being received from the communication module.

7. The image processing device of claim 6, wherein the processor selects a camera module of a predetermined highest priority from among the plurality of camera modules or a camera module with a least load from among the plurality of camera modules as the master camera module.

8. An image processing method performed by a host device comprising a processor and a communication module, the image processing method comprising:
receiving, by the communication module, a multiple image data request from a client terminal;
receiving, by the communication module, a plurality of pieces of image data obtained by a plurality of camera modules that are mounted in one network camera and face in a plurality of different directions;
based on an operation error of the host device not being detected:
scaling, by the processor, the plurality of pieces of image data in response to the multiple image data request; and
in response to the multiple image data request, which requests the one network camera to simultaneously transmit the plurality of pieces of image data obtained by the plurality of camera modules, generating, by the processor, multiple image data by combining a plurality of pieces of scaled image data; and
transmitting, by the communication module, a multiple image data response comprising the multiple image data to the client terminal,
based on the operation error of the host device being detected:
selecting one camera module as a master camera module from among the plurality of camera modules; and
enabling the master camera module to perform a function of the communication module or a function of the processor in response to a network service provision request being received by the master camera module from the communication module; and
rebooting the host device and providing a path to access the network camera after the network service provision request is transmitted to the master camera module,
wherein the plurality of camera modules share one internet protocol (IP) address.

9. The method of claim 8, wherein the communication module receives, from a network switch, the plurality of pieces of image data encoded by the plurality of camera modules.

10. The method of claim 9, wherein the scaling of the plurality of pieces of image data comprises:
    decoding, by a decoder, the plurality of pieces of image data; and
    scaling, by a scaler, a plurality of pieces of decoded image data, and
    the generating of the multiple image data comprises:
    generating, by a multiplexer, the multiple image data by combining the plurality of pieces of scaled image data; and
    encoding, by an encoder, the multiple image data.

11. The method of claim 10, wherein, in the scaling of the plurality of pieces of decoded image data, the plurality of pieces of decoded image data are scaled by the scaler, such that a sum of resolutions of the plurality of pieces of scaled image data is lower than or equal to a resolution required by the client terminal.

12. The method of claim 8, wherein the communication module and the processor are included in the host device,
    the method further comprises selecting the one camera module from among the plurality of camera modules as the master camera module when the processor detects the operation error of the host device; and
    transmitting, through the communication module, the network service provision request to the master camera module, and
    the master camera module performs the function of the communication module and the function of the processor in response to the network service provision request.

13. The method of claim 12, wherein, in the selecting of the master camera module, the processor selects a camera module of a predetermined highest priority from among the plurality of camera modules or a camera module with a least load from among the plurality of camera modules as the master camera module.

14. The method of claim 8, wherein the receiving of the multiple image data request and the transmitting of the multiple image data response are performed by the host device,
    the receiving of the plurality of pieces of image data comprises receiving the plurality of pieces of image data as raw data prior to image processing, by a field programmable gate array (FPGA) device distinct from the host device, and
    the scaling of the plurality of pieces of image data and the generating of the multiple image data are performed by the FPGA device based on the raw data.

* * * * *